(12) United States Patent
Sharpes

(10) Patent No.: US 11,489,463 B2
(45) Date of Patent: Nov. 1, 2022

(54) ANKLE MOVEMENT CAPTURE AND CONVERSION INTO ENERGY

(71) Applicant: The Government of the United States, as represented by the Secretary of the Army, Washington, DC (US)

(72) Inventor: Nathan Sharpes, Abingdon, MD (US)

(73) Assignee: The Government of the United States, as represented by the Secretary of the Army, Washington, DC (US)

(*) Notice: Subject to any disclaimer, the term of this patent is extended or adjusted under 35 U.S.C. 154(b) by 497 days.

(21) Appl. No.: 16/550,329

(22) Filed: Aug. 26, 2019

(65) Prior Publication Data
US 2020/0068984 A1 Mar. 5, 2020

Related U.S. Application Data

(60) Provisional application No. 62/724,824, filed on Aug. 30, 2018.

(51) Int. Cl.
| | |
|---|---|
| *H02N 2/18* | (2006.01) |
| *A43B 21/24* | (2006.01) |
| *H02J 7/32* | (2006.01) |
| *H02K 7/18* | (2006.01) |
| *A43B 21/30* | (2006.01) |
| *F16D 41/00* | (2006.01) |
| *F16D 67/02* | (2006.01) |
| *H02K 7/112* | (2006.01) |
| *A41D 1/00* | (2018.01) |
| *F16H 3/44* | (2006.01) |
| *F16H 57/10* | (2006.01) |
| *H02K 7/116* | (2006.01) |
| *A43B 3/38* | (2022.01) |
| *F03G 5/06* | (2006.01) |

(Continued)

(52) U.S. Cl.
CPC .............. *H02N 2/18* (2013.01); *A41D 1/002* (2013.01); *A43B 3/38* (2022.01); *A43B 21/24* (2013.01); *A43B 21/30* (2013.01); *F03G 5/063* (2021.08); *F16D 41/00* (2013.01); *F16D 67/02* (2013.01); *F16H 3/44* (2013.01); *F16H 57/10* (2013.01); *H02J 7/32* (2013.01); *H02K 7/112* (2013.01); *H02K 7/116* (2013.01); *H02K 7/1853* (2013.01); *A43B 3/42* (2022.01); *F16H 2200/0034* (2013.01); *F16H 2200/20* (2013.01); *F16H 2200/2005* (2013.01); *H02J 7/00032* (2020.01)

(58) Field of Classification Search
CPC ....................................................... H02N 2/18
USPC ......................................................... 320/137
See application file for complete search history.

(56) References Cited

U.S. PATENT DOCUMENTS

2006/0046907 A1* 3/2006 Rastegar ............ A63B 21/0552
482/148
2008/0278028 A1* 11/2008 Donelan .............. H02K 7/1853
310/300

(Continued)

*Primary Examiner* — Jerry D Robbins
(74) *Attorney, Agent, or Firm* — Ronald Krosky

(57) ABSTRACT

A portion of ankle movement can be harnessed into stored energy that can be released for various purposes, such as to assist in movement or to charge a battery. This harnessing can be achieved in various manners. In one example manner, an offset pulley component can transfer ankle movement to a generator in a shoe insole. In another example manner, a slider can cause a brace arch to match an ankle arch such that the movement is appropriately harnessed.

20 Claims, 11 Drawing Sheets

(51) Int. Cl.
  *H02J 7/00*   (2006.01)
  *A43B 3/42*   (2022.01)

(56) References Cited

U.S. PATENT DOCUMENTS

2009/0259320 A1* 10/2009 Andrysek ............ H02K 7/1853
                                                        623/24
2011/0278857 A1* 11/2011 Sugar .................... F03G 7/08
                                                        290/1 C
2015/0059204 A1*  3/2015 Alexander .......... A43B 3/0084
                                                        36/44
2016/0372990 A1* 12/2016 Williamson ............. F03G 5/08

* cited by examiner

ANKLE MOVEMENT CAPTURE AND CONVERSION INTO ENERGY

CROSS-REFERENCE

This application claims priority to U.S. Provisional Application No. 62/724,824 filed on Aug. 30, 2018. U.S. Provisional Application No. 62/724,824 is hereby incorporated by reference.

GOVERNMENT INTEREST

The innovation described herein may be manufactured, used, imported, sold, and licensed by or for the Government of the United States of America without the payment of any royalty thereon or therefor.

BACKGROUND

Batteries can be used to store energy. In one example, a cellular telephone or radio can be powered by batteries. Without being physically tethered to a wall outlet, this gives the user a great amount of physical freedom when using the cellular telephone or radio.

However, batteries have a finite storage capacity. The cellular telephone or radio can drain a battery until the battery is drained. Therefore, the cellular telephone or radio can have a limited amount of usage until the battery is replaced or recharged.

SUMMARY

In one embodiment, a footwear system can comprise a capture hardware component and a conversion hardware component. The capture hardware component can be configured to capture a movement of an ankle joint. The conversion hardware component can be configured to convert the movement into an energy.

In another embodiment, a brace associated with a footwear can comprise a capture hardware component configured to capture a rotational movement of an ankle joint derived from forward/backward motion of a wearer of the footwear. The brace can also comprise a transfer hardware component configured to transfer the rotational movement to a non-ankle part of the footwear. The brace can additionally comprise a drivetrain hardware component configured to receive the transfer of the rotational movement and configured to use the transferred rotational movement to power a generator.

In yet another embodiment, a footwear support can comprise a drivetrain and a generator. The drivetrain can be configured to perform a rotation in response to transferred rotational movement from an ankle of a wearer of the footwear support. The generator can be configured to generate an electricity in response to the rotation.

BRIEF DESCRIPTION OF THE DRAWINGS

Incorporated herein are drawings that constitute a part of the specification and illustrate embodiments of the detailed description. The detailed description will now be described further with reference to the accompanying drawings as follows:

Multiple figures can be collectively referred to as a single figure. For example, FIGS. 5A-5D illustrate four separate figures, but can collectively be referred to as 'FIG. 5." Additionally, parts of figures can be referred to in short form. For example, part 'a' of FIG. 2 can be referred to as FIG. 2a.

DETAILED DESCRIPTION

Figure 1:
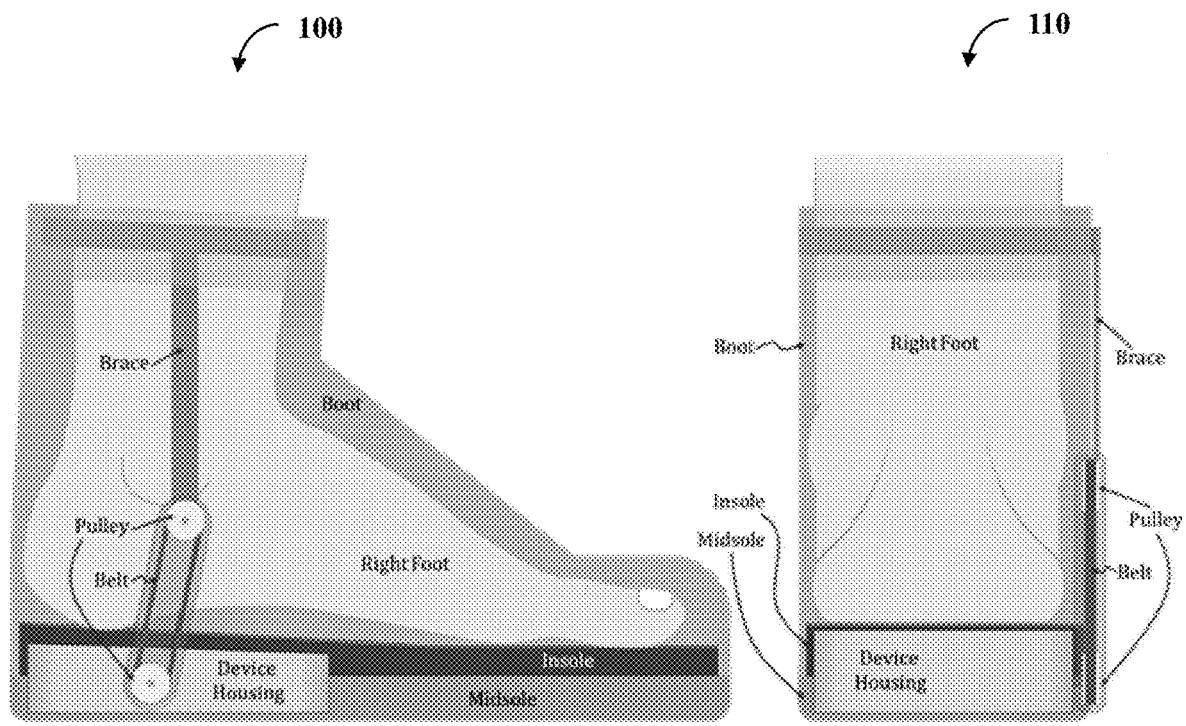
FIG. 1 illustrates one embodiment of a boot work on a right foot with a side view and a back view.

A person can wear hardware that converts physical motion into electrical energy. The electrical energy can recharge a battery, such as a battery of a personal electronic device (e.g., a cellular telephone or radio). In one embodiment, leg motion from walking or running can be leveraged to produce battery charging energy.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a boot work on a right foot with a side view 100 and a back view 110. A brace can function as a capture hardware component configured to capture a movement of an ankle joint associated with the right foot. While discussed with the right foot, it is to be appreciated that the brace can be implemented to capture a movement of an ankle joint associated with the left foot at well, but with some physical aspects reversed in view of the changed foot.

A device housing can function as a conversion hardware component configured to convert the movement into a stored energy. As illustrated, the capture hardware component can be at least partially located upon the ankle joint while the conversion hardware component can be located at least partially away from the ankle joint, such as part of the heel (e.g., beneath the insole).

Various embodiment can be employed to transfer to movement of the ankle joint/brace to the device housing. In one embodiment, a pulley component can be configured to transfer the captured movement of the ankle joint to the conversion hardware component. The pulley component can comprise a pulley, such as two drums, and a belt. The first drum can couple to the brace at a first end and the second drum can be couple to the device housing (e.g., to the conversion hardware component) at the second end.

In one embodiment, a brace component can be part of the capture hardware component. The brace component can be configured to transfer the captured movement of the ankle joint to the conversion hardware component. The brace component can comprise of a member, which is rigid in the directions orthogonal to the axis of rotation, connected at the first end to the uppermost portion of the leg of the boot (at the anatomical calf) and at the second end to the device conversion hardware component.

Figure 2:
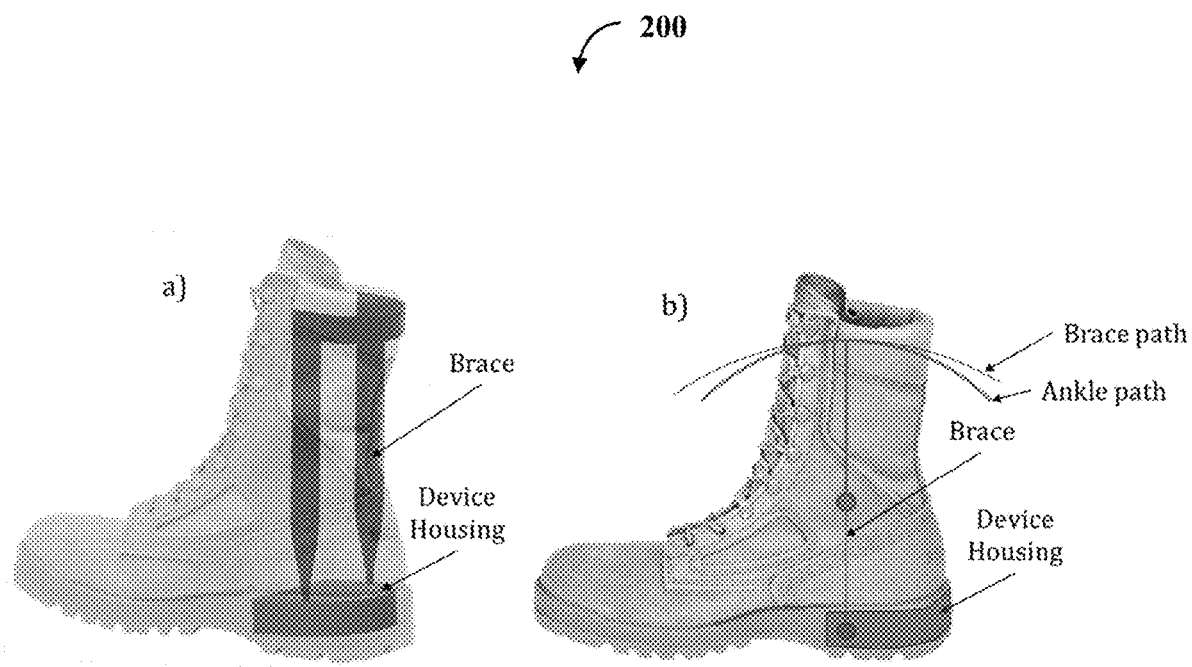
FIG. 2 illustrates one embodiment of a boot with a brace and a device housing.

FIG. 2 illustrates one embodiment of a boot 200 with a brace and a device housing. An 'a' part of FIG. 2 illustrates a physical implementation and a 'b' part of FIG. 2 illustrates a conceptual illustration. Part 'b' illustrates a path for the brace and a path for the ankle if the brace center or rotation (e.g., located in the device housing) is aligned in the Coronal Plane to the anatomical ankle center or rotation. With this configuration, the paths do not match which can cause difficulty for a wearer of the boot 200 (e.g., since the center or rotation for an ankle would be different than the center of rotation of the brace, this mismatch could cause the brace to rub on a wearer's calf causing chafing as well as loss of physical torque). Therefore, the brace can be designed to at least partially alleviate this difficulty.

Figure 3:
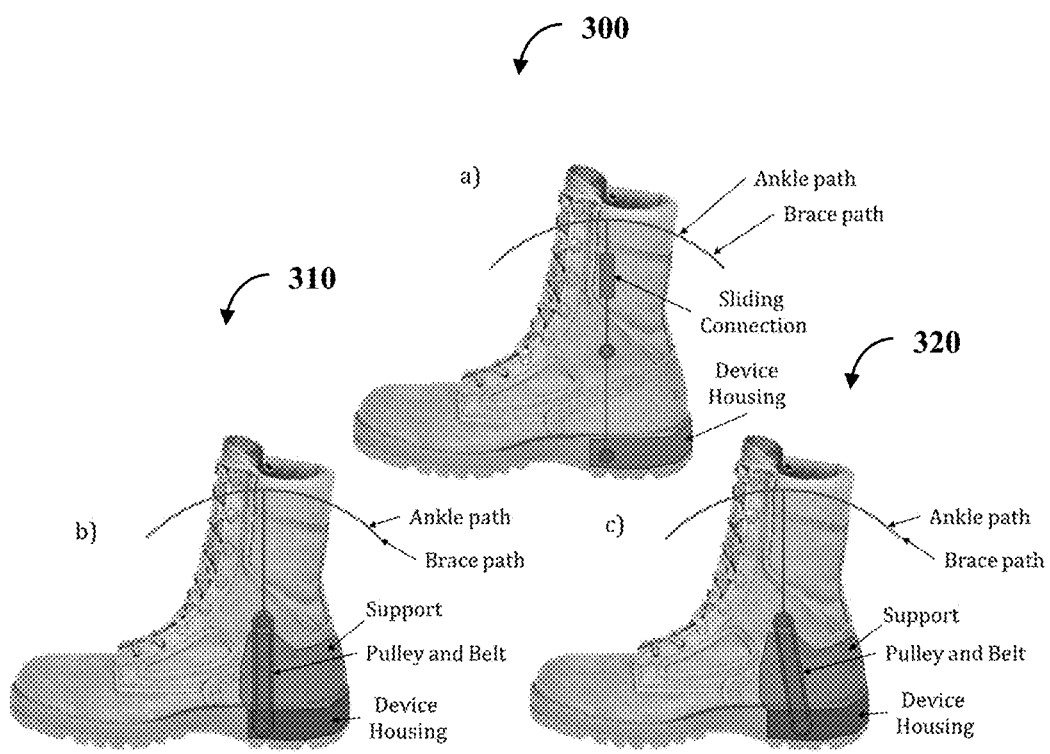
FIG. 3 illustrates three embodiments of a boot.

FIG. 3 illustrates three embodiments of a boot—the 'a' embodiment being a boot 300 with a slider, the 'b' embodiment being a boot 310 with an aligned pulley component, and the 'c' embodiment being a booth 320 with an offset pulley component. The slider can function as a slider connection component configured to move along the radial direction of the brace, while still being rigid in the tangential direction, so a movement arch of the brace matches a movement arch of the ankle joint. For the 'b' embodiment, the movement arches between the brace and ankle centers of rotation can also be realized using an aligned pulley component and for the 'c' embodiment, the pulley component is offset, as illustrated in FIG. 1. Using a pulley component allows a relatively large amount (e.g., about all) of ankle rotation to be transferred to the conversion hardware component.

Figure 4:
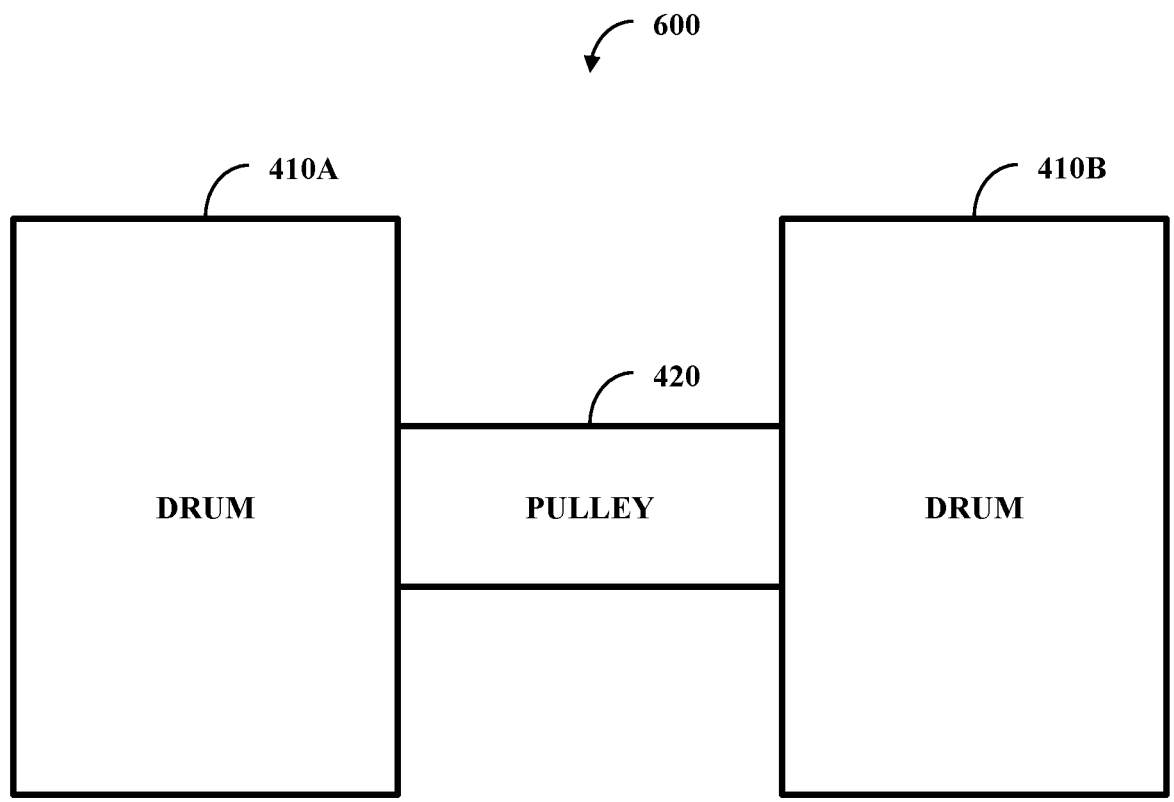
FIG. 4 illustrates one embodiment of a pulley component.
Figure 5A:
FIGS. 5A-5D illustrates four embodiments of boot renderings.
Figure 5B:
Figure 5C:
Figure 5D:

FIG. 4 illustrates one embodiment of a pulley component comprising drums 410A and 410B and a pulley belt 420, which can be protected by a protective housing. The drums and pulley belt can be protected within a housing, such as be located outside a footwear outer wear protection layer (e.g., outside leather of a boot). Additionally, the capture hardware component can be located outside a footwear outer wearer protection layer (e.g., outer leather of the boot) and also be protected by the protected housing.

FIGS. 1-3 illustrate embodiments of anatomical ankle torque transfer to a boot integrated device. Assistive wearable devices can be useful for enabling the disabled to have a more normal life, and also for the able-bodied to move about more efficiently, prevent injury, etc. For the case of a passive mechanical assistive wearable devices (e.g., those which do not impart additional energy on the body, but rather store and release energy during different types of motion, such as energy is derived from the body's motion (e.g., and not another source, like a battery)), an anthropomorphic design can be used to function in concert with the body. Such a design can be difficult to achieve, as the body's joints are internal, while a wearable system is external to the body. Having a device which receives power from a joint, then, could tend to result in a bulky extension of the joint in the lateral direction. This can be avoided by relocating the device powered by the joint away from that joint. It is then a question of having a manner to transfer the torque from the joint to the location of the device.

In the case of the ankle joint, a device and brace structure can be integrated into a boot, such that the torque about the ankle can be interfaced with via a brace integrated into the leg of the boot and transferred to a device integrated into the boot midsole through a pulley and belt. This topology is illustrated in FIG. 1 with the two views 100 and 110. In one embodiment, the brace does not simply connect to the device and transfer torque directly, as in the rendering 200 of FIG. 2a, because, as the rendering 210 in FIG. 2b illustrates, the axis of rotation would be different from the brace and for the ankle.

This arrangement can have the brace slide up and down the leg, causing chaffing and wear to the boot, and extra friction which the boot wearer would have to overcome that would cause discomfort for the wearer and cause use of extra energy. A slider (e.g., slider component) can be added to the brace, as illustrated in the rendering 300 of FIG. 3a, such that the disparity in curvature of the arcs of rotation in radial direction is taken up by the slider, but torque can still be transferred. With this design, the degree of angular rotation imparted into the device from the brace can be less than what the degree of rotation the anatomical ankle produces, since the centers of rotation are in different places. The amount of rotation experienced by the ankle during normal motions (e.g. walking) can be relatively small. Thus, diminishing of rotation input can impair possible device functionality.

For an improved design, the center of rotation for the brace can be at the center of rotation of the ankle. Torque can then be transferred to a generator, which can be accomplished with the pulley component (e.g., a pulley and belt system), as illustrated in the rendering 310 of FIG. 3b. The pulley component could be of any type, for example round, flat, V, or timing belt varieties. Additionally, a chain and sprocket could be used (e.g., the chain and sprocket implementing as the pulley component). The use of the pulley component can allow for the interface of torque input to the device to not be aligned with the leg of the boot, as is shown in the rendering 320 of FIG. 3c. In this way, there can be a large amount of design freedom for the layout and location of the device integrated within the boot midsole.

A prototype of the concept illustrated in FIG. 3c can be fabricated. The device housing usurps the volume of the midsole of the heel portion of the boot and a support structure connects to the housing to hold the brace to pulley connection at the location of the anatomical ankle's center of rotation. The vertical riser of the brace can be made of carbon fiber, formed in a broad but thin profile. The stiffness of the brace can be large in the direction of brace rotation (e.g., Sagittal plane), but compliant in the transverse direction (e.g., Coronal plane). Since the ankle joint has more than one degree of freedom, it can be appropriate to allow the brace to flex and not impede motion in any direction but receive torque in the plantar-/dorsi-flexion rotations. The top of the brace can loop around the shank, and can be integrated into the padding at the top of the boot leg. FIG. 4 is for the right foot, but is applicable to the left foot as well. The configuration can be mirrored, such that the brace is to the lateral side of the left foot.

FIGS. 5A-5D illustrates four embodiments of boot renderings 500-530. The renderings 500-530 can illustrate hardware configurations where torque of the ankle is transferred to a base of the boot for energy storage. The stored energy can be employed in different manners. In one embodiment, the stored energy is returned to a wearer of the footwear system to aid in motion (e.g., the boot with hardware functions as an assistive wearable device). In another embodiment, the stored energy is employed to power a generator. In one example, the transferred energy be transferred down the brace and the brace can cause a drivetrain to rotate. The drivetrain can be coupled to or be part of a generator. Rotation of the drivetrain can cause the generator to produce a charge to supply a battery (e.g., battery of a personal electronic device of the wearer of the boot, such as a radio or smartphone).

The brace can be construed in different ways. In one embodiment, the brace comprises the capture hardware component (e.g., located upon the ankle joint and outside the boot leather) that is configured to capture a rotational movement of an ankle joint derived from forward/backward motion of a wearer of the boot. In addition, the brace can comprise the transfer hardware component (e.g., pulley and drums) configured to transfer the rotational movement to a non-ankle part of the footwear. The brace can also comprise a drivetrain hardware component configured to receive the transfer of the rotational movement and configured to use the transferred rotational movement to power a generator. The generator can generate an electricity from the power supplied by the drivetrain and this electricity can charge the battery.

In one embodiment, the brace can additionally comprise a slider hardware component (e.g., when arranged without the pulley and drums). The slider hardware component can be configured to move in a head-to-toe direction during the rotational movement. This can produce a result such that a rotation arch of the brace matches a rotation arch of the ankle during the rotational movement.

Returning to the renderings 500-530, the rendering 500 can be of a prototype apparatus to transfer torque from the anatomical ankle to a boot integrated device. The rendering 510 can be of a prototype apparatus to transfer torque from the anatomical ankle to a boot integrated device, with foot and internal mechanism housing visible. The rendering 520 can be of a prototype apparatus to transfer torque from the anatomical ankle to a boot integrated device, with foot and internal torque transfer mechanism (e.g., the pulley component implemented as drums and belt) visible. The rendering 530 can be of a prototype apparatus to transfer torque from the anatomical ankle to a boot integrated device, with internal torque transfer mechanism (pulleys and belt) visible. The renderings 500-530 can be covered in leather for protection (e.g., cover the pulley and belt).

Aspects disclosed herein can pertain to wearable items, such as a boot. The boot can be worn by a soldier and soldier acceptance can be desirable. In one example, a soldier will reject a boot if something is extending from the boot since this can become a hazard (e.g., caught on a tree branch causing a trip), become more noticeable and thus give away a position, etc. Therefore, features can be integrated in the boot.

In one embodiment, the torque of the ankle of the boot wearer can be subjected to energy harvesting (e.g., plantar-flexion). If the mechanism is embedded in the boot, then the center of rotation of the boot can be different than the ankle (illustrated in FIG. 2B). The embodiment illustrated in FIG. 3 can transfer the rotation of the ankle down to the base of the boot. Therefore, ankle torque can be transferred.

Figure 6:
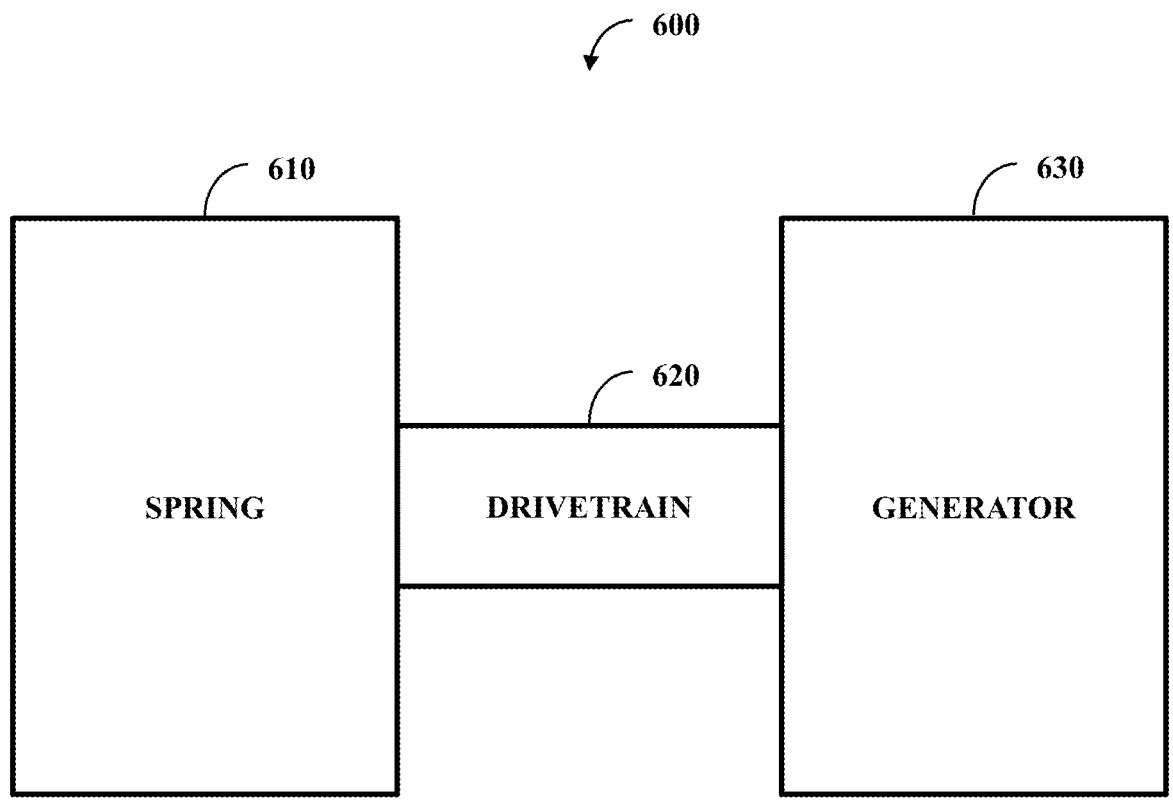
FIG. 6 illustrates one embodiment of a footwear system comprising a spring, a drivetrain, and a generator.

FIG. 6 illustrates one embodiment of a footwear system 600 comprising a spring 610, a drivetrain 620, and a generator 630. In one embodiment, the spring 610 can be a rotational spring that is coupled to a drum of the pulley component. When the drum rotates (e.g., the drum associated with the energy conversion component), then the spring 610 can be loaded with potential energy. When the drum stops rotating, the spring 610 can release the potential energy such that the drivetrain 620 rotates (e.g., the drivetrain being a rod or a gear set). The rotation of the drivetrain 620 can cause rotation of at least part of the generator 630 such that the generator 630 produces an electricity. The generator 630 can comprise a coupling hardware component (e.g., a power cord) configured to operatively couple the generator 630 to a battery of a personal electronic device of a wearer of the footwear system 600. The electricity can charge the battery by way of the coupling hardware component.

Figure 7:
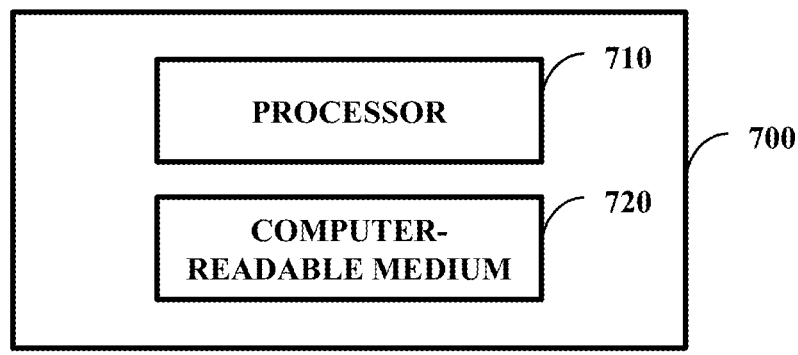
FIG. 7 illustrates one embodiment of a system comprising a processor and a computer-readable medium.

FIG. 7 illustrates one embodiment of a system 700 comprising a processor 710 and a computer-readable medium 720 (e.g., non-transitory computer-readable medium). In one embodiment, the computer-readable medium 720 is communicatively coupled to the processor 710 and stores a command set executable by the processor 710 to facilitate operation of at least one component disclosed (e.g., a reception component configured to receive design plans for a footwear system disclosed herein). In one embodiment, at least one component disclosed herein (e.g., construction component configured to manage construction of a footwear system disclosed herein in accordance with the design plans) can be implemented, at least in part, by way of non-software, such as implemented as hardware by way of the system 700. In one embodiment, the computer-readable medium 720 is configured to store processor-executable instructions that when executed by the processor 710, cause the processor 710 to perform at least part of a method disclosed herein (e.g., at least part of the method 800 discussed below).

Figure 8:
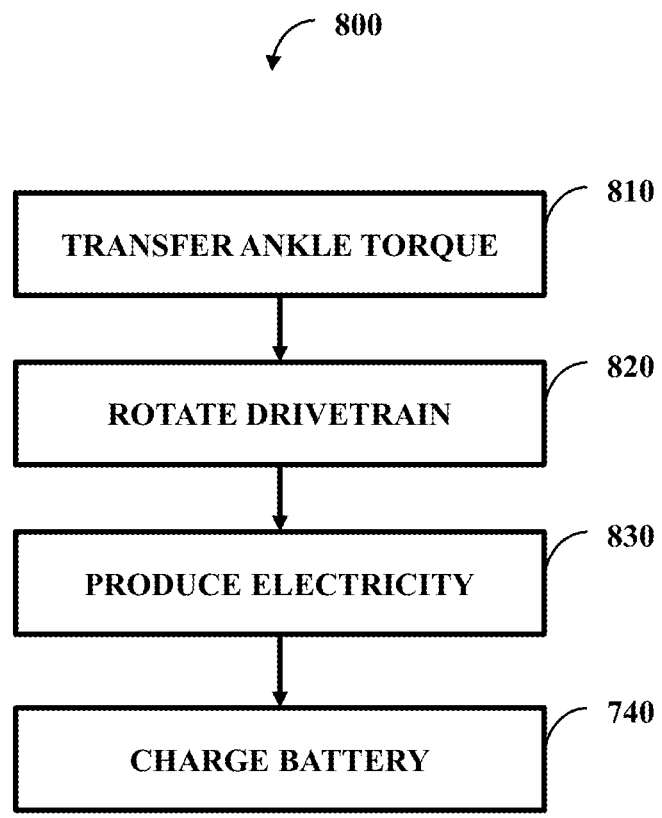
FIG. 8 illustrates one embodiment of a method comprising four actions.

FIG. 8 illustrates one embodiment of a method 800 comprising four actions 810-840. At least part of the method 800 can be performed by a footwear support (e.g., at least part of the system 600 of FIG. 6, such as when it is part of a boot insole). At 810, a brace (e.g., that is part of the footwear system) can transfer ankle torque to the drivetrain 620 of FIG. 6 and in turn the drivetrain 620 of FIG. 6 performs a rotation in response to transferred rotational movement from an ankle of a wearer of the footwear support at 820.

In one embodiment, the drivetrain 620 of FIG. 6 receives the transferred rotational movement by way of a pulley affixed to a hardware joint (e.g., the drum) that functions in conjunction with an ankle joint of a wearer of the footwear support. In one embodiment, the drivetrain 620 of FIG. 6 receives the transferred rotational movement by way of a rigid linkage affixed to a hardware joint that functions in conjunction with an ankle joint of a wearer of the footwear support. The rigid linkage can employ a slider to have an arch of the hardware joint match an arch of the ankle.

As the drivetrain rotates in response to the ankle movement, part of the generator 630 of FIG. 6 can rotate such that an electricity is produced at 830. The produced electricity can be transferred to a battery (e.g., by way of the coupling hardware component). The transferred electricity can charge the battery.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:

1. A footwear system, comprising:
a capture hardware component configured to capture a movement of an ankle joint;
a conversion hardware component configured to convert the movement into an energy; and
a slider connection component configured to move along the joint-to-joint axis so a movement arch of the brace matches a movement arch of the ankle joint,
where the capture hardware component is located upon the ankle joint,
where the conversion hardware component is located away from the ankle joint, and
where the conversion hardware component is, at least in part, located as part of a heel of the footwear item.

2. The footwear system of claim 1,
where the capture hardware component and the conversion hardware component are offset on a heel-to-ankle plane.

3. The footwear system of claim 1,
where the capture hardware component is located outside a footwear outer wearer protection layer.

4. The footwear system of claim 1,
where the energy is returned to a wearer of the footwear system to aid in motion.

5. The footwear system of claim 1,
where the energy rotates a drivetrain,
where the drivetrain turns a generator, and
where the generator produces a charge to supply a battery.

6. The footwear system of claim 1,
where the capture hardware component is configured to capture the movement of the ankle joint, through a capture hardware component rotation, that mirrors a rotation of the ankle joint and
where a center of capture hardware component rotation is about equal to the rotation of the ankle joint.

7. The footwear system of claim 6,
where the movement of the ankle joint captured by the capture hardware component is from a degree of angular rotation smaller than a degree of angular rotation of the ankle joint.

8. The footwear system of claim 1,
where the capture hardware component comprises a brace.

9. The footwear system of claim 1,
where the conversion hardware component comprises a device housing.

10. The footwear system of claim 1,
where the slider is rigid in a tangential direction to the joint-to-joint axis.

11. The footwear system of claim 1, comprising:
a generator with a drivetrain; and
a battery operatively coupled to the generator,
where the energy rotates a drivetrain to cause the generator to produce a charge supplied to the battery.

12. A brace associated with a footwear, comprising:
a capture hardware component configured to capture a rotational movement of an ankle joint derived from forward/backward motion of a wearer of the footwear;
a transfer hardware component configured to transfer the rotational movement to a non-ankle part of the footwear;
a drivetrain hardware component configured to receive the transfer of the rotational movement and configured to use the transferred rotational movement to power a generator; and
a slider hardware component configured to move in a head-to-toe direction during the rotational movement such that a rotation arch of the brace matches a rotation arch of the ankle during the rotational movement,
where the capture hardware component is located upon the ankle joint and
where the generator is located within a heel of the footwear.

13. The brace of claim 12,
where the capture hardware component is located outside a footwear outer wearer protection layer.

14. The brace of claim 12, comprising:
the generator configured to generate an electricity from the power supplied by the drivetrain,
where a battery is operatively coupled to the generator and
where the electricity charges the battery.

15. The brace of claim 14, comprising:
the battery,
where the battery is removable.

16. The brace of claim 12,
where the capture hardware component and the drivetrain are offset in accordance with head-toe axis of the wearer.

17. The brace of claim 12,
where the capture hardware component is configured to capture the movement of the ankle joint, through a capture hardware component rotation, that mirrors a rotation of the ankle joint and
where a center of capture hardware component rotation is about equal to the rotation of the ankle joint.

18. The brace of claim 17,
where the movement of the ankle joint captured by the capture hardware component is from a degree of angular rotation smaller than a degree of angular rotation of the ankle joint.

19. A footwear support, comprising:
a drivetrain configured to perform a rotation in response to transferred rotational movement from an ankle of a wearer of the footwear support; and
a generator configured to generate an electricity in response to the rotation, where the drivetrain receives the transferred rotational movement by way of a rigid linkage affixed to a hardware joint that functions in conjunction with an ankle joint of a wearer of the footwear support and where the rigid linkage employs a slider to have an arch of the hardware joint match an arch of the ankle.

20. The footwear support of claim 19, comprising:

a coupling hardware component configured to operatively couple the generator to a battery of a personal electronic device of the wearer, where the electricity charges the battery by way of the coupling hardware component.

\* \* \* \* \*